(12) United States Patent  (10) Patent No.: US 7,396,028 B2
Smith  (45) Date of Patent: Jul. 8, 2008

(54) LIFTING SYSTEM FOR A VEHICLE AXLE

(75) Inventor: Aaron M. Smith, Paw Paw, MI (US)

(73) Assignee: Dana Heavy Vehicle Systems Group LLC, Toledo, OH (US)

( * ) Notice: Subject to any disclaimer, the term of this patent is extended or adjusted under 35 U.S.C. 154(b) by 217 days.

(21) Appl. No.: 11/280,831

(22) Filed: Nov. 16, 2005

(65) Prior Publication Data

US 2007/0108711 A1 May 17, 2007

(51) Int. Cl.
*B60G 9/00* (2006.01)
(52) U.S. Cl. .................... 280/124.116; 280/86.5
(58) Field of Classification Search .......... 280/124.116, 280/124.128, 124.1, 86.5, 124.157
See application file for complete search history.

(56) References Cited

U.S. PATENT DOCUMENTS

| | | | | |
|---|---|---|---|---|
| 2,869,891 | A | * | 1/1959 | Venditty et al. ....... 280/124.106 |
| 2,947,547 | A | | 8/1960 | Gouirand |
| 3,961,826 | A | * | 6/1976 | Sweet et al. ................. 301/125 |
| 4,711,464 | A | * | 12/1987 | Bilas .......................... 280/86.5 |
| 4,763,923 | A | | 8/1988 | Raidel |
| 4,763,953 | A | * | 8/1988 | Chalin ....................... 298/17 S |
| 4,773,670 | A | | 9/1988 | Raidel, II |
| 4,854,409 | A | | 8/1989 | Hillebrand et al. |
| 5,015,004 | A | | 5/1991 | Mitchell |
| 5,018,756 | A | | 5/1991 | Mitchell |
| 5,505,481 | A | | 4/1996 | VanDenberg et al. |
| 5,597,172 | A | * | 1/1997 | Maiwald et al. ....... 280/124.153 |
| 6,158,750 | A | | 12/2000 | Gideon et al. |
| 6,311,993 | B1 | | 11/2001 | Hulstein et al. |
| 6,425,593 | B2 | * | 7/2002 | Fabris et al. ................. 280/104 |
| 6,845,989 | B2 | | 1/2005 | Fulton et al. |
| 6,871,862 | B2 | | 3/2005 | Chalin |
| 7,168,717 | B2 | * | 1/2007 | Wubben et al. ....... 280/124.127 |
| 2004/0256820 | A1 | | 12/2004 | Chalin et al. |

FOREIGN PATENT DOCUMENTS

| | | |
|---|---|---|
| CA | 933 462 A | 7/1976 |
| DE | 41 26 998 A1 | 2/1993 |
| EP | 284572 A2 * | 9/1988 |
| EP | 473214 A1 | 3/1992 |
| FR | 2 614 594 A1 | 11/1988 |
| FR | 2 679 216 A1 | 1/1993 |
| FR | 2 686 551 A1 | 7/1993 |
| GB | 2 157 240 A | 10/1985 |
| GB | 2 164 007 A | 3/1986 |

* cited by examiner

*Primary Examiner*—Faye M. Fleming
(74) *Attorney, Agent, or Firm*—Marshall & Melhorn LLC

(57) ABSTRACT

An apparatus and lifting method for a vehicle axle having a first bracket, a second bracket, an air spring and at least one connector. The first bracket has two substantially vertically oriented slots. The second bracket has a substantially horizontal plate and a bar secured to the plate. The ends of the bar extend through the vertically oriented slots. The air spring is located under the horizontal plate. Connectors connect the bar to the axle housing so that when the air bag is inflated the second bracket, with the bar, is moved upwardly. The axle housing, being connected to the bar via the connectors is also drawn upwardly.

11 Claims, 3 Drawing Sheets

LIFTING SYSTEM FOR A VEHICLE AXLE

FIELD OF THE INVENTION

The present invention relates to a method and apparatus for a lifting system for a vehicle axle.

BACKGROUND OF THE INVENTION

Mechanisms to lift a vehicle axle are well known in the prior art. A brief survey of some of the prior art designs allows them to be categorized generally into two classes.

The first class is at least partially comprised of U.S. Pat. Nos. 6,871,862, 6,854,989, 6,311,993, 5,505,481, 5,018,756, 5,015,004 and 4,763,923 and U.S. Patent Application Publication No. 2004/0256820. Each generally shows an air bag connected at one end to the vehicle frame via a hanger bracket that is suspended below the frame. The other end of the air bag is connected to one end of a pivoting arm or arms. The other end of the pivoting arm is connected directly or indirectly to a vehicle axle. An identical arrangement to that just described is located on the other side of the vehicle frame. Generally speaking, inflation of the air bag causes the arm or arms to pivot and move rearwardly. The rearward movement pushes the axle upwardly. To lower the axle, the air bag is simply deflated.

U.S. Pat. Nos. 4,773,670 and 6,158,750 and European Patent Application Publication No. 04732 14A1 are part of the second class of prior art documents as they teach air bags which provide a lifting force that is perpendicular to the vehicle frame. Both U.S. Pat. Nos. 4,773,670 and 6,158,750 locate the air bag within a complicated parallelogram frame. The air bags act on the arms of the frame to directly or indirectly force the axle upwardly.

European Patent Application Publication No. 04732 14A1 differs from the above described patents of the second class in that it teaches air bags having one of end attached to the chassis and the other end attached a bridge between two frame members. The bridge is connected to an auxiliary frame. An air spring bellows is connected at one end to the auxiliary frame, thus locating it outboard from the air bags. The other end of the air spring bellows is connected to a platform. The axle is mounted to the platform.

The above-described prior art designs suffer from several disadvantages. For example, many of them require at least two air bags to move the axle. The air bags, their associated structures and control mechanisms add to the cost of the vehicle and take up valuable space on the underside of the vehicle. Further, many of the above-identified systems are complicated and thus making them unreliable and expensive to maintain and repair. In light of these disadvantages of the prior art, it would be desirable to have a lifting system for a vehicle axle that is simple and inexpensive.

SUMMARY OF THE INVENTION

The present invention is directed toward a lifting system for a vehicle axle having a first bracket, a second bracket, an air spring and at least two connectors. The first bracket has two substantially vertically oriented slots. The second bracket has a substantially horizontal plate. A bar is secured to the plate and the ends of the bar extend through the vertically oriented slots. The air spring is located under the horizontal plate. A first connector has one end connected to one end of the bar and the other end of the first connector is connected to an axle housing. A second connector has one end connected to the other end of the bar and the other end of the second connector is connected to the axle housing.

It can be appreciated that when the air bag is inflated, it pushes the horizontal plate upwardly. The bar, being connected to the plate, also moves upwardly. The connectors, which connect the bar with the axle housing, draw the axle housing upwardly as the bag is inflated.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
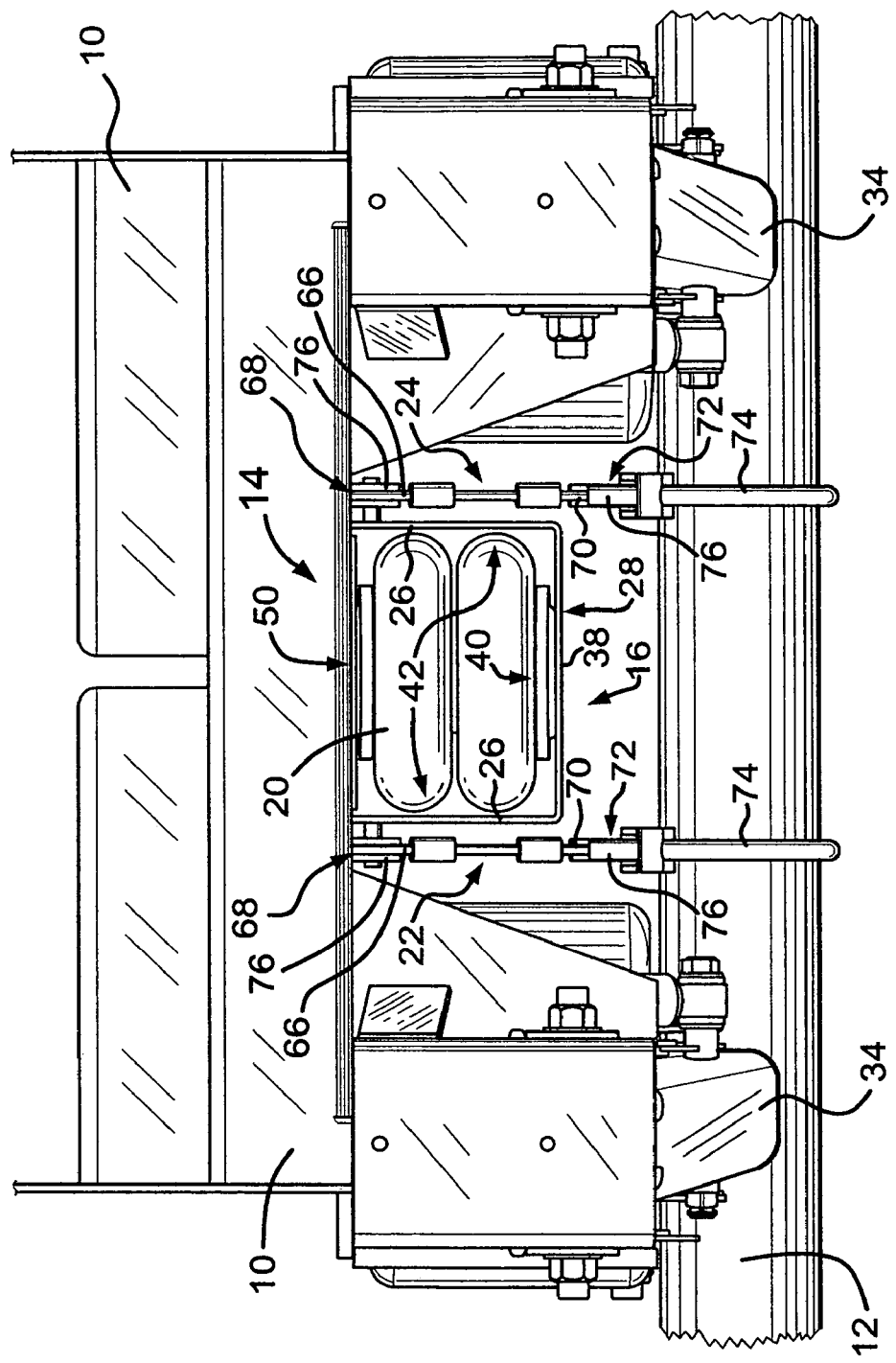
FIG. 1 is a schematic rear view of the present invention.
Figure 2:
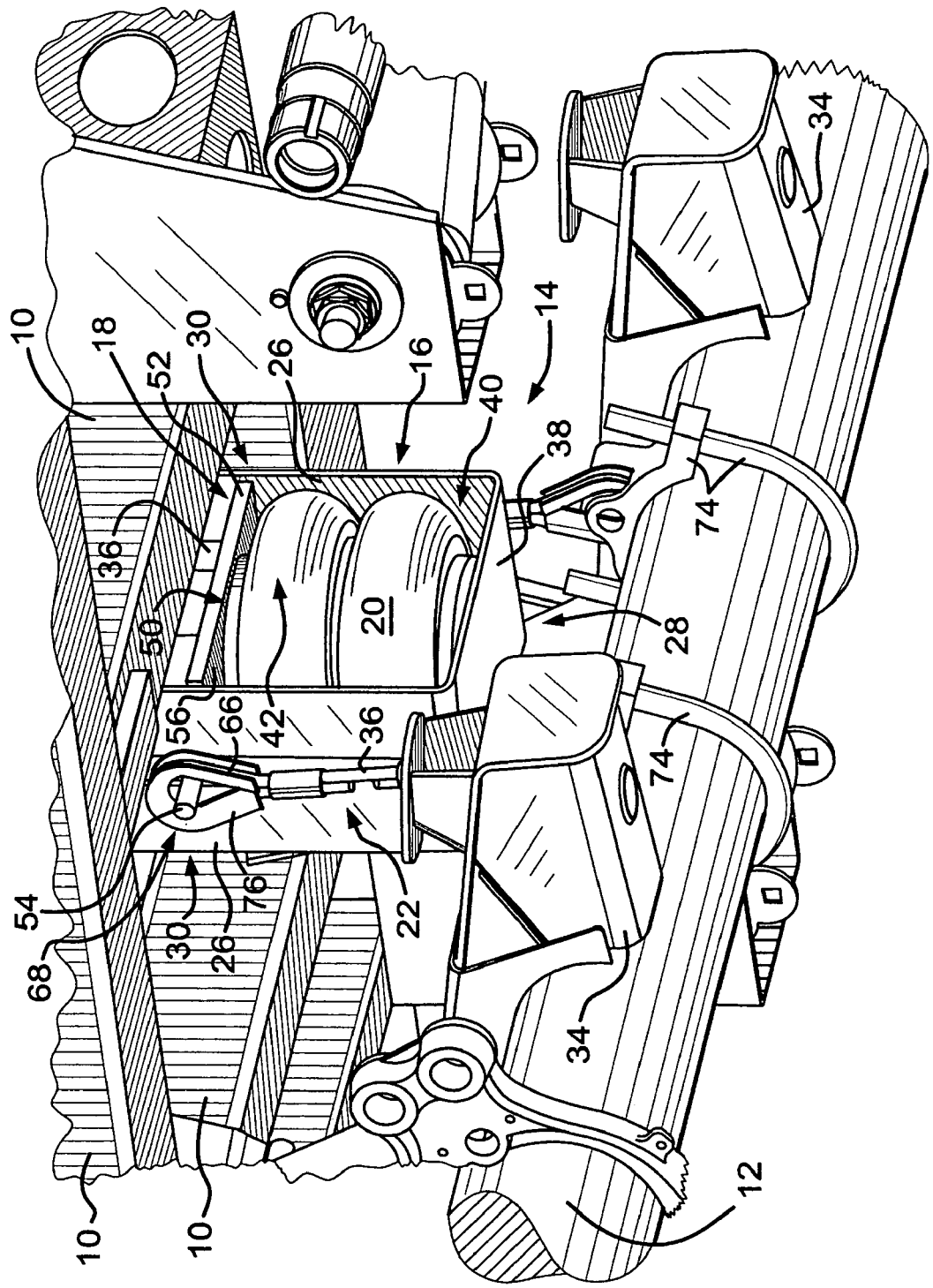
FIG. 2 is a lower left schematic perspective view of the present invention.
Figure 3:
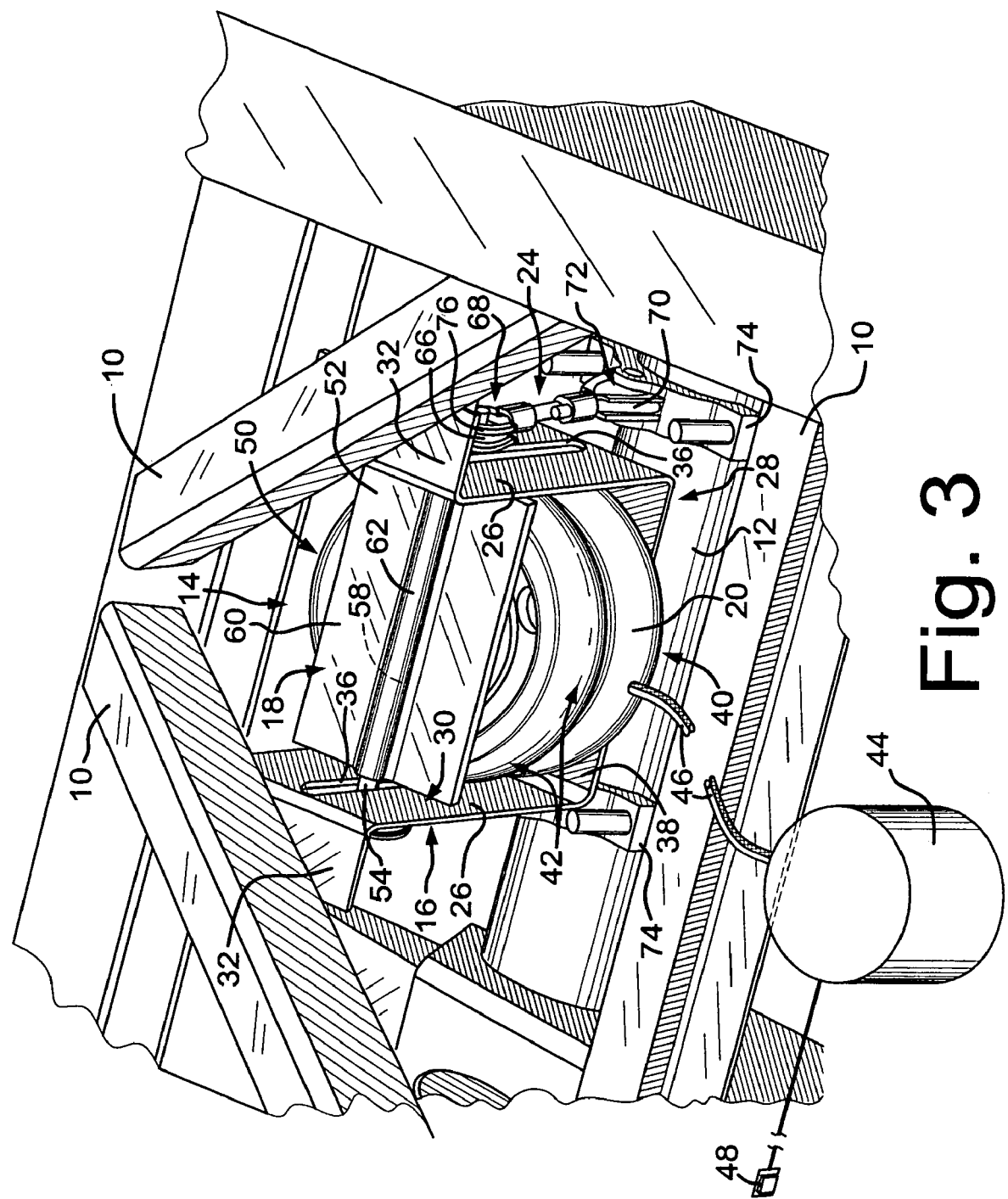
FIG. 3 is an upper right schematic perspective view of the present invention.

Referring now to FIGS. 1, 2 and 3, the frame members 10 of a vehicle can be seen. The vehicle may be such as, by way of example only, a tractor or a semi-trailer. In the embodiment depicted in the figures, the vehicle is a semi-trailer. While the figures depict a particular orientation of the frame members 10, the present invention is not limited to frame members 10 in this orientation. Instead, the present invention is compatible with almost any frame member orientation.

The figures partially depict an axle housing 12 of the vehicle. The terms axle and axle housing are used interchangeably throughout. Located preferably substantially above the axle housing 12 is a lifting mechanism 14 of the present invention. The lifting mechanism 14 is comprised of a first bracket 16, a second bracket 18, an air bag 20 and at least two connectors 22, 24. The first bracket 16 has two side walls 26 and a bottom portion 28. An upper portion 30 of each side wall 26 is secured to at least one frame member 10 of the vehicle. The upper portion 30 may be secured to the frame member 10 with mechanical-type fasteners, such as nuts and bolts. Additionally, or alternatively, the first bracket 16 can be welded to at least one frame member 10. As best seen in FIG. 3, the upper portion 30 of each side wall 26 has a flange 32 that extends in an outboard direction. In the preferred embodiment of the invention, the flanges 32 are each secured to a frame member 10.

The side walls 26 of the first bracket 16 are substantially vertically oriented and substantially parallel to one another. Preferably, the side walls 26 of the first bracket 16 are also substantially parallel to a pair of trailing arms 34 attached to the axle housing 12. As best seen in FIG. 1, the side walls 26 are located inboard from the trailing arms 34.

A substantially vertically oriented slot 36 is located in each of the side walls 26 of the first bracket 16. Each slot 36 preferably extends from the upper portion 30 to the bottom portion 28 of the first bracket 16.

The bottom portion 28 of the first bracket 16 comprises a substantially horizontal plate 38. The plate 38 is preferably connected to the two side walls 26, which extend upwardly in a substantially perpendicular orientation from the plate 38. The plate 38 may be connected to the two side walls 26 with mechanical fasteners and/or welding, however, it is preferred that the plate 38 is integrally formed with the side walls 26.

FIGS. 1, 2 and 3 also depict the air bag 20 supported by the first bracket 16. Preferably, the air bag is mounted on the first bracket 16 so that the air bag 20 is in a substantially vertical orientation. A bottom portion 40 of the air bag 20 is secured to the plate 38 of the first bracket 16 preferably with one or more mechanical fasteners.

As shown in FIG. 1, some side portions 42 of the air bag 20 are located adjacent the side walls 26 of the first bracket 16. It is preferred; however, that the side portions 42 of the air bag 20 do not contact the side walls 26 of the first bracket 16 to prevent wear on the air bag 20. As best seen in FIG. 3, other side portions 42 of the air bag 20 may extend over the plate 38 of the first bracket 16. It is also well within the scope of the present invention for the plate 38 of the first bracket 16 to be located entirely under the air bag 20.

The air bag 20 is connected to an air source 44 via at least one air line 46. The air source 44 may be such as an air compressor or an air reservoir located on the vehicle. The air compressor is selectively turned on and off via a control device 48, such as a switch. The control device 48 may be located any where on the vehicle, including in the operator's compartment of the tractor or on the semi-trailer.

An upper portion 50 of the air bag 20 is in contact with the second bracket 18. The second bracket 18 is preferably comprised of a substantially horizontally oriented plate 52 and two anchor portions 54. Preferably, the upper portion 50 of the air bag 20 is in contact with a bottom surface 56 of the horizontally oriented plate 52. The upper portion 50 of the air bag 20 may be secured to the horizontally oriented plate 52 with one or more mechanical fasteners or the horizontally oriented plate 52 may simply be frictionally engaged with the air bag 20.

The substantially horizontally oriented plate 52 is preferably parallel with the plate 38 of the first bracket 16 and substantially perpendicular to the side walls 26 of the first bracket 16. It is also preferred that the plate 52 of the second bracket 18 extend from one side of the air bag 20 to the other side of the air bag 20. As shown in FIG. 3, however, the plate 52 need not cover the entire upper portion 50 of the air bag 20.

The anchor portions 54 are preferably part of the end portions of a bar 58 that extends across an upper surface 60 of the horizontally oriented plate 52 of the second bracket 18. As best seen in FIG. 3, the bar 58 is located within a housing 62 that is secured to the upper surface 60 of the horizontally oriented plate 52. The housing 62 may be secured to the plate 52 by welding and/or mechanical fasteners.

As can be seen in FIGS. 2 and 3, each anchor portion 54 extends in an outboard direction through one of the vertically oriented slots 36 of the first bracket 16. The anchor portions 54 each have a connector 22, 24 connecting the anchor portion 54 to the axle housing 12. More specifically, the connectors 22, 24 are preferably comprised of a flexible cable having an upper loop 66 on a first end 68 and a lower loop 70 on a second end 72. Each upper loop 66 on the first end 68 of each connector 22, 24 is located around the anchor portion 54 of the second bracket 18. Each lower loop 70 on the second end 72 of each connector 22, 24 is secured to a bracket 74 secured to the axle housing 12.

The bracket 74 secured to the axle housing 12 may be such as a U-bolt, as shown in the figures, however, other brackets may be used on the axle housing 12. Reinforcing channels 76 are preferably located between the upper loops 66 and the anchor portions 54 and between the lower loops 70 and the brackets 74 to prevent wear on the connectors 22, 24.

Although a cable is mentioned above and depicted in the figures, it can be appreciated that the present invention is not limited solely to cables for the connectors 22, 24. Other connectors include, but are not limited to, chains and rigid links constructed of metal, such as steel.

While the above description has focused on a single lifting mechanism 14 for a single axle 12, it can be appreciated that more than one of the above-described lifting mechanisms 14 can be used for a single axle 12 or that one or more lifting mechanisms 14 can be used to lift more than one axle 12 of a single vehicle. By way of example only, two lifting systems 14 can be located above an axle housing 12 where the lifting systems 14 are located side-by-side one another. By way of yet another example, it can be appreciated that one or more lifting systems 14 can be used to lift a forward axle 12 of a tandem axle system 14 and one or more lifting systems can be used to lift a rear axle 12 of the same tandem axle system.

A preferred method of raising an axle 12 utilizing the present invention will now be described. For purposes of clarity, it will be assumed that an axle 12 to be raised is currently located in a down position so that the tires associated with the axle 12 are in contact with the ground or road. When it is desired to raise the axle 12, the operator engages the air compressor or signals the air reservoir to provide compressed air via the at least one air line 46 to the air bag 20. The air bag 20, when the axle 12 is in the down position, is substantially compressed. It can be appreciated that when compressed air enters the interior of the air bag 20, the air bag 20 begins to inflate and extend in a substantially vertical direction. The air bag 20, being fixed against the bottom portion 28 of the first bracket 16, is forced to extend in an upward vertical direction. As the air bag 20 extends in an upward direction, it pushes the substantially horizontal plate 52 connected to the upper portion 50 of the air bag 20 in an upward vertical direction.

The substantially horizontal plate 52 moves in an upward direction carrying with it the bar 58 and its associated anchor portions 54. The anchor portions 54, located in the vertically oriented slots 36 of the first bracket 16, move upwardly in the slots 36 as the air bag 20 inflates. The vertically oriented slots 36 assure that the air bag 20 inflates in a substantially vertical direction and that the anchor portions 54 rise in a substantially vertical direction.

It can be appreciated that the anchor portions 54 urge the connectors 22, 24 secured to the anchor portions 54 in an upward direction contemporaneously. The connectors 22, 24, being secured to the axle housing 12, thus urge the axle housing 12 in an upward direction. Compressed air is continued to be located into the air bag 20 until the second bracket 18 urges the axle housing 12, through the connectors 22, 24, to a desired position.

For example, if the axle 12 is to be raised off of the ground, a sufficient quantity of compressed air is located in the air bag 20 so that it extends a first predetermined vertical distance. The first predetermined vertical distance is sufficient to push the second bracket 18 a second predetermined vertical distance so that the connectors 22, 24 pull the axle 12 housing a third predetermined vertical distance. The third predetermined distanced is sufficient to raise the wheels associated with the axle 12 off of the ground and to clear any obstacles on the ground.

To lower the axle housing 12 to any position from the fully raised position to a position where the wheels associated with the axle 12 are in contact with the ground, air is released from the air bag 20. Gravity pulls the axle housing 12 downwardly until the desired position of the axle housing 12 is reached.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A lifting mechanism for a vehicle axle, comprising:
   a first bracket oriented perpendicular to and located directly above a vehicle axle and having two substantially vertically oriented slots;
   a second bracket comprising a substantially horizontal plate and a bar secured to said plate wherein end portions of said bar extends through said vertically oriented slots;
   an air bag located under said horizontal plate;
   a first connector having one end connected to one end portion of said bar and the other end of said first connector being connected to an axle housing; and
   a second connector having one end connected to the other end portion of said bar and the other end of said second connector being connected to said axle housing.

2. The mechanism of claim 1, wherein said first bracket has two substantially vertical walls wherein each wall defines one of said vertically oriented slots and each of said walls are secured to at least one frame member.

3. The mechanism of claim 2, wherein said two substantially vertical walls of said first bracket are connected by a substantially horizontal bottom portion, said vertical walls and said horizontal bottom portion being located substantially above said axle housing.

4. The mechanism of claim 3, wherein said air bag is vertically oriented in said first bracket and located between said horizontal bottom portion and said second bracket.

5. The mechanism of claim 1, wherein both said first connector and said second connector have a first loop located around said bar and a second loop connected to a bracket located about said axle housing, both of said connectors being substantially vertically oriented.

6. The mechanism of claim 1, wherein said first and second connectors are flexible cables.

7. A lifting mechanism for a vehicle axle, comprising:
   a first bracket secured to a vehicle frame and located directly over an axle housing of a vehicle, said first bracket having two side portions and bottom portion, wherein each of said two side portions have a vertically oriented slot;
   a second bracket having a horizontally oriented plate, two anchor portions extending from said plate through said vertically oriented slots;
   a vertically oriented air bag having an upper portion and a lower portion, said lower portion in contact with said bottom portion of said first bracket and said upper portion in contact with said horizontally oriented plate of said second bracket; and
   two connectors connecting said two anchor portions of said second bracket with said axle housing.

8. A method of lifting a vehicle axle, comprising:
   inflating a substantially vertically oriented single air bag, said air bag oriented perpendicular to and located directly above a vehicle axle and having one end in contact with a first bracket and having the other end in contact with a second bracket;
   pushing said second bracket upwardly via said air bag so that anchor portions and anchor points from said second bracket are located beyond and move upwardly in vertically oriented slots in said first bracket;
   urging an axle housing upwardly through connectors connecting said anchor portions with said axle housing.

9. The method of claim 8, wherein said air bag moves a substantially horizontal plate of said second bracket upwardly to urge said anchor portions connected to said plate upwardly.

10. The method of claim 9, wherein said anchor portions pull said connectors connected to said axle housing with U-bolts upwardly.

11. The method of claim 8, further comprising transmitting the lifting force of said air bag via said second bracket directly to said axle housing.

* * * * *